UNITED STATES PATENT OFFICE.

ADOLF CLEMM, OF MANNHEIM, GERMANY.

MANUFACTURE OF ALUMINA AND ALKALI COMPOUNDS OF SULFUR.

No. 845,854.   Specification of Letters Patent.   Patented March 5, 1907.

Application filed April 5, 1906. Serial No. 310,099.

*To all whom it may concern:*

Be it known that I, ADOLF CLEMM, a subject of the German Emperor, and a resident of Mannheim, Germany, have invented certain new and useful Improvements in the Manufacture of Alumina and Alkali Compounds Containing Sulfur, of which the following is a specification.

This invention has for its object to convert bauxite or other aluminiferous material and alkali sulfate into alumina and sulfur-containing alkali compounds other than alkali sulfate. For this purpose alkali sulfate and carbon are intimately mixed with bauxite or similar aluminiferous material whereby such proportions of the sulfate (and carbon) are used as are multiples of those theoretically required to form an alkali aluminate. As an example one hundred parts, by weight, of bauxite (containing about sixty-one per cent. $Al_2O_3$) are mixed with three hundred parts of sulfate of soda and sixty parts of carbon, the mixture being then calcined, the calcined mass lixiviated, and sulfurous-acid gas is introduced into the solution until the alumina is precipitated, thiosulfate remaining in solution. The reaction may be illustrated by the following equation:

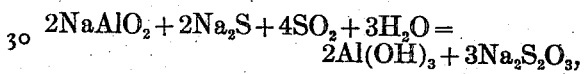

$$2NaAlO_2 + 2Na_2S + 4SO_2 + 3H_2O = 2Al(OH)_3 + 3Na_2S_2O_3,$$

but I do not confine myself to the proportions given, as the quality of the raw materials employed may render them more or less variable. This mixture is calcined and the calcined mass lixiviated with water, when an alkali aluminate and an excess of alkali sulfid are obtained in a solution which is generally of a yellowish or greenish color and can be clarified by allowing it to stand or by filtration. By treating this solution with sulfurous acid (preferably with the application of heat) the alumina of the bauxite used is obtained as a white precipitate of aluminium hydroxid and the alkali sulfid contained in the solution is converted into alkali thiosulfate. The separated aluminium hydroxid is filtered off and washed and the solution may be evaporated and treated to obtain crystallized alkali thiosulfate.

Instead of treating the solution first with sulfurous acid it may be treated with sulfureted hydrogen, (preferably also with the application of heat.) In this case also the alumina is precipitated, and the remaining solution of alkali sulfohydrate and alkali sulfid is then treated with sulfurous acid in order to obtain the thiosulfate. However, the said solution may also be used directly—for instance, for reduction purposes in chemical manufactures—or sodium sulfid may be obtained from it.

The residue remaining after the lixiviation of the calcined mass retains as a rule some alkali and sulfur compounds, from which further quantities of thiosulfate may be obtained. This is effected by allowing the residue (to which some milk of lime may be added in order to accelerate the oxidation) to effloresce in the air or by blowing air through the residue, the mass being thereupon lixiviated with water and thiosulfate allowed to crystallize out of the liquor thus obtained after it has been suitably concentrated.

It has often been attempted to replace the sodium carbonate by sodium sulfate and coal to produce the aluminate; but it was found that by using equivalent quantities of sodium oxid and alumina (equal parts of $Na_2O$ and $Al_2O_3$) the yield of alumina dissolved was less than in the sodium-carbonate process, while a considerable part of the sodium oxid was "scorified"—that is, converted into a form insoluble in water. It was further found that if an excess of sodium sulfate was used the lyes contained sulfid, which rendered them unsuitable for the recuperation of sodium in the form of sodium carbonate. In the specification of the German Patent No. 62,265 it is stated that from theoretical considerations the use of a quantity of alkali greater than that which is the equivalent of the alumina is quite unnecessary and that the use of more alkali sulfate is even injurious, because it causes the lyes to be rich in sulfur. In the specification of the German Patent No. 93,952 it is stated that the inventor had succeeded in working without the accessory formation of sulfids, so that it is evident from this that in decomposing the aluminate by carbon dioxid for the purpose of obtaining sodium carbonate all the contents of sulfid must be considered as a disadvantage. I have, however, found that the disadvantage referred to in the aforesaid specifications and the presence of sulfids in the solution of aluminate is advantageous if these solutions be converted into a sulfureted product—such as alkali thiosulfate, alkali sulfohydrate, and alkali sulfid—and not into sodium carbonate, and I have further found that the rendering soluble or opening out of the bauxite or the like and the rendering of the alumina soluble are all the more perfect the more sodium sulfate and coal are used and that in using sodium sulfate two hundred per cent. in excess of the quantity equivalent to the alumina the opening out of the bauxite or the like succeeds as perfectly as with sodium carbonate. I have further found that in using the aforesaid excess of sodium sulfate the losses in sulfur are much less than when only equivalent quantities of sodium oxid and alumina are taken, a portion of the sulfur being found in the yellowish to greenish lyes as polysulfid and that the much-feared compound of sodium sulfid and iron sulfid (see the specifications of German Patents No. 62,265 and 93,952) can be removed by oxidation in the air and utilized for obtaining thiosulfate, whereas they are injurious and the cause of losses when sodium carbonate is extracted.

The problem of how the solution of aluminate charged intentionally for a definite purpose with so large an excess of alkali sulfid is to be dealt with has been solved by me in the following manner: Instead of decomposing by carbon dioxid and obtaining sodium carbonate I use sulfurous acid or sulfureted hydrogen in order to obtain a sulfureted product, and I form in the first case thiosulfate with the same quantity of sulfurous acid as is used to decompose the solution of aluminate and precipitate the alumina, whereas in the second case I likewise precipitate the alumina by means of sulfureted hydrogen and obtain sulfids and sulfohydrate. I have further found that the alkali salt, which (as in the sodium-carbonate process) becomes insoluble in water and is a source of loss, can be utilized in my process, as by oxidizing the residues remaining after the lixiviation a considerable portion of the alkali salt is obtained in a form soluble in water—namely, in the form of thiosulfate.

The advantages of the process according to my invention may be summed up as follows: First, by using a very large excess of alkali sulfate and coal the opening out or rendering soluble of the bauxite or the like is almost complete; secondly, the rendering soluble of the bauxite and the simultaneous formation of alkali sulfid are effected in one simple operation; thirdly, instead of precipitating by means of carbon dioxid and obtaining alkali carbonate, alumina, and thiosulfate or sulfid and sulfohydrate in solution are obtained simultaneously or in one and the same operation by the use of sulfurous acid or sulfureted hydrogen, and, fourthly, the alkaline residues of the lixiviation which are insoluble in water and which would otherwise be a source of loss are obtained in a valuable soluble form as thiosulfate.

I claim—

1. In the process of manufacturing alumina and alkali thiosulfate, a step which consists in mixing aluminiferous material with quantities of alkali sulfate and carbon which are multiples of those theoretically required to form an alkali aluminate and calcining the mixture, substantially as and for the purpose set forth.

2. The process of manufacturing alumina and alkali thiosulfate which consists of mixing aluminiferous material with quantities of alkali sulfate and carbon which are multiples of those theoretically required to form an alkali aluminate and calcining the mixture, lixiviating the calcined mass and treating the solution with sulfurous acid, substantially as and for the purpose set forth.

3. The process of manufacturing alumina and thiosulfate, which consists in mixing aluminiferous material with quantities of alkali sulfate and carbon which are multiples of those theoretically required to form an alkali aluminate, calcining the mixture, lixiviating the calcined mass, treating the solution with sulfurous acid, treating the insoluble residues of lixiviation by oxidizing agents, treating the products of oxidation with water, concentrating the solution thus obtained and allowing the thiosulfate contained therein to crystallize out as and for the purpose set forth.

In testimony whereof I have signed my name to this specification in the presence of two subscribing witnesses.

ADOLF CLEMM.

Witnesses:
 H. W. HARRIS,
 JOS. H. LEUTE.